United States Patent [19]

Tsukamoto

[11] Patent Number: 4,534,173

[45] Date of Patent: Aug. 13, 1985

[54] MEANS FOR SUPPLYING A SECONDARY AIR IN AN INTERNAL COMBUSTION ENGINE WHICH IS PROVIDED WITH A TURBO CHARGER

[75] Inventor: Hiroaki Tsukamoto, Saitama, Japan

[73] Assignee: Honda Giken Kogyo Kabushiki Kaisha, Japan

[21] Appl. No.: 435,182

[22] Filed: Oct. 19, 1982

[30] Foreign Application Priority Data

| Oct. 19, 1981 | [JP] | Japan | 56-166920 |
| Nov. 2, 1981 | [JP] | Japan | 56-176073 |
| Feb. 15, 1982 | [JP] | Japan | 57-22451 |

[51] Int. Cl.³ .................................................. F02B 37/00
[52] U.S. Cl. ........................................ 60/606; 60/280; 60/290; 60/293
[58] Field of Search ............... 60/280, 290, 293, 304, 60/305, 606

[56] References Cited

U.S. PATENT DOCUMENTS

| 3,232,044 | 2/1966 | Gratzmuller | 60/280 |
| 4,091,620 | 5/1978 | Dorsch | 60/290 |

FOREIGN PATENT DOCUMENTS

| 2,929,419 | 1/1981 | Fed. Rep. of Germany | 60/606 |
| 864443 | 1/1941 | France | 60/606 |

*Primary Examiner*—Douglas Hart
*Attorney, Agent, or Firm*—Sughrue, Mion, Zinn, Macpeak, and Seas

[57] ABSTRACT

An internal combustion engine having a supercharger utilizes a secondary air supply control system for purifying exhaust gas. A secondary air supply passage with a reservoir chamber is provided in the middle of an intake passage communicating with an exhaust gas passage. A check valve prevents the back flow of exhaust gas in the middle of the secondary air supply passage. The secondary air passage in another embodiment has the intake passage downstream of a compressor or reservoir chamber in communication with the exhaust passage. A suitable amount of air is supplied into the exhaust passage from the intake passage or reservoir, at high pressure via the secondary air passage and check valve.

4 Claims, 5 Drawing Figures

MEANS FOR SUPPLYING A SECONDARY AIR IN AN INTERNAL COMBUSTION ENGINE WHICH IS PROVIDED WITH A TURBO CHARGER

BACKGROUND OF THE INVENTION

This invention relates to a means for supplying a supply secondary air into an exhaust passage in an internal combustion engine which is provided with a turbo charger to purify the exhaust gas.

In the prior art a method has been utilized to supply secondary air into an exhaust passage in an internal combustion engine to burn the unburned components such as CO, HC or the like which are contained in the exhaust gas, thereby reducing the emission of CO or HC. In accordance with such a method, the secondary air is supplied into the exhaust passage utilizing a pressure difference between atmospheric pressure and a negative pressure (absolute pressure) which is induced by the flow of the exhaust gas in the exhaust passage. However, turbulence is created in a negative pressure pulsation generated in the high speed driving range of the engine. This makes it impossible to provide a sufficiently large pressure difference betwen the negative pressure and the atmospheric pressure. As the result, the rate of the secondary air quantity with respect to the exhausted gas quantity is decreased. In particular, since the exhaust gas pressure becomes high in the case of an internal combustion engine that is provided with a turbo charger, the rate of the secondary air quantity in the high speed driving range is lowered even more than in a conventional engine. In this case, it becomes more difficult to reduce emissions in the exhaust passage.

Conversely, if one portion of the intake air is supplied into the exhausted air passage as the secondary air supply as mentioned above, in a heavy load condition where a high output is required of the engine, for example, when ascending a slope or when accelerated abruptly, the quantity of the air which is supplied to the engine decreases, thereby making it difficult to obtain the necessary high output.

SUMMARY OF THE INVENTION

The present invention solves the problem as mentioned above relative to the use of turbo chargers and supplying a secondary air supply.

An object of the present invention is to provide a means for supplying a secondary air in an internal combustion engine which is provided with a turbo charger, which makes it possible to sufficiently reduce the emission of CO or HC due to the supply of the secondary air in the exhausted air passage without providing any special pump or the like for supplying the air.

It is another object of this invention to define a device which can be manufactured at a low cost having a simple structure, and furthermore, which is superior in durability and which can be easily serviced.

In accordance with the first embodiment of the present invention, there is provided a secondary air supply passage with a reservoir chamber provided in the middle of an intake passage which communicates with an exhaust gas passage. A check valve prevents the back flow of exhausted gas in the middle of the secondary air supply passage and a suitable amount of secondary air is supplied into the exhausted gas passage from the reservoir chamber which is at a high pressure via the secondary air supply passage and the check valve.

In accordance with the second embodiment of the present invention, there is provided a supply secondary air in an internal combustion engine provided with a turbo charger in which there is a secondary air supply passage by which an exhaust passage and an intake passage downstream a compressor or a reservoir chamber which is provided in the middle of the intake passage communicate with each other. A check valve prevents the back flow of the exhausted gas in the middle of this secondary air supply passage and a suitable amount of secondary air is supplied into the exhaust passage from the intake passage or the reservoir chamber which has a high pressure via the secondary air supply passage and the check valve. This makes it possible to sufficiently reduce the emission of CO or HC due to the secondary air supply in the exhaust passage without providing any special pump or the like for supplying the air even in the high speed driving range of the engine. Furthermore, the supply of the secondary air into the exhaust passage is interrupted when the engine is running under heavy load conditions, so that all the intake air is supplied to the engine. This secures the air required for the engine to maintain the high output of the engine operating in a heavy load condition.

In accordance with another embodiment of the present invention, there is provided a secondary air supply control system for purifying the exhausted gas in an internal combustion engine with a turbocharger. In this embodiment, air at atmospheric pressure is introduced as the secondary air by opening a one-way valve utilizing the exhaust pulsation pressure in the low speed, idling and decelerating ranges of the engine when the exhaust pulsation pressure is stable. The secondary air of the positive pressure is directed into an exhaust system by way of a one-way valve utilizing the turbocharged air pressure which is created in the intake system in the middle and high speed driving range of the engine when there is turbulence in the exhaust pulsation, thereby making it possible that a suitable amount of secondary air is supplied into the exhaust system over the entire driving range of the engine.

BRIEF DESCRIPTION OF THE DRAWINGS

FIG. 3 is a schematic systematic view thereof and FIG. 4 is an enlarged side view in longitudinal cross section of a switch valve.

DETAILED DESCRIPTION OF THE PREFERRED EMBODIMENTS

Figure 1:
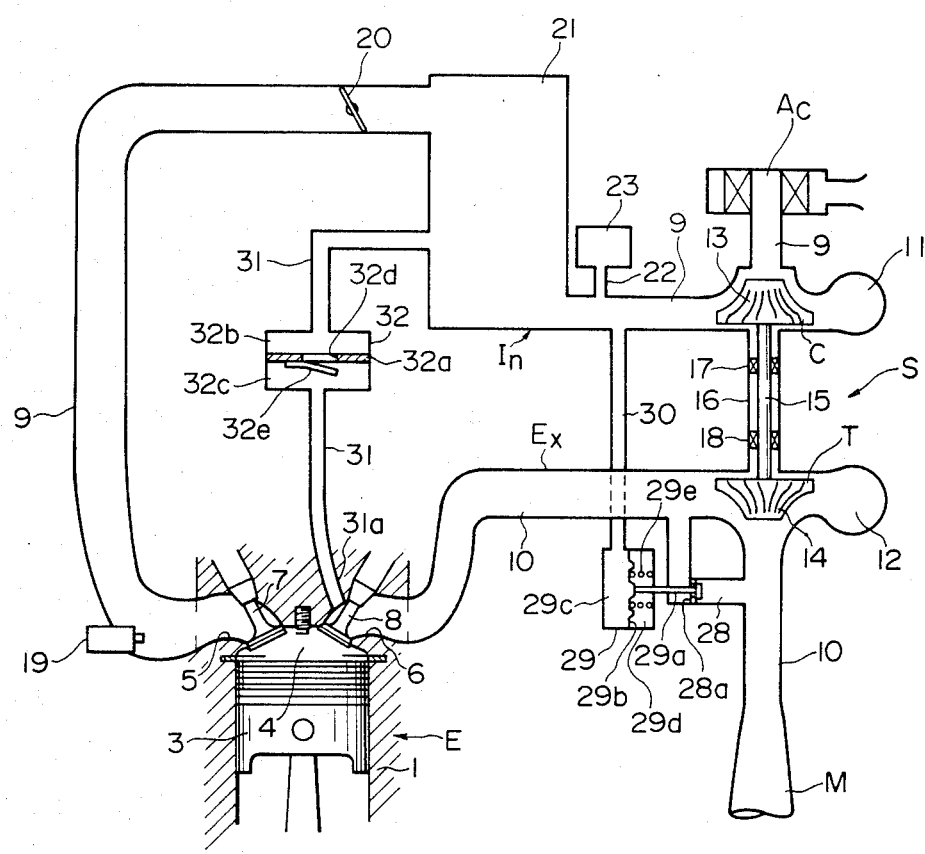
FIG. 1 is a schematic view showing a first embodiment of an internal combustion engine which is provided with a turbo charger.

A first embodiment in accordance with the present invention will be explained with reference to the accompanying drawings.

An internal combustion engine E comprises a cylinder block 1 in which a piston 3 is slidably fitted in a known manner and a cylinder head 2 is provided above the cylinder block 1 in such a way as to be connected thereto. The cylinder head 2 and the piston 3 form a combustion chamber 4. An intake port 5 and an exhaust port 6 are formed in this combustion chamber 4. Ports 5 and 6 are alternately opened and closed by means of an intake valve 7 and an exhaust valve 8 respectively.

An intake passage 9 and an exhaust passage 10 are formed respectively at the outer ends of the intake port 5 and the exhaust port 6. There is provided a turbocharger S between passages 9 and 10. An explanation will now be given with respect to the construction of the turbocharger S. The turbocharger S comprises a turbine T which is interposed in the middle of the exhaust passage 10 and a compressor C which is interposed in the middle of the intake passage 9. The turbine T is constructed in such a way to house a turbine disc 14 in a turbine chamber 12 which is formed in the middle of the exhaust passage 10. On the other hand, the compressor C is constituted in such a way as to house a compressor disc 13 in a compressor chamber 11 which is formed in the middle of the intake passage 9. The turbine chamber 12 and the compressor chamber 11 are integrally coupled to each other by means of a bearing holder 16. The turbine disc 14 and the compressor disc 13 are coupled to each other in such a way to integrally rotate by a rotary shaft 15 which is supported in the bearing holder 16 by means of bearings 17 and 18.

An air cleaner Ac is provided at the opening end of the intake pipe 9. There are provided in order a compressor C of the turbo charger S and a pre-chamber 21 as a reservoir chamber in the intake pipe 9 towards the intake port 5. There is provided an exhaust turbine T of the turbo charger S in the exhaust pipe 10 and a muffler M at the discharging end of the exhaust pipe 10.

A fuel jet nozzle 19 is positioned in the intake passage 9 near the intake port 5. In addition, a throttle valve 20 is disposed at the upstream side thereof. Furthermore, a pre-chamber 21 is formed in such a way as to partially enlarge the cross sectional area of the intake passage 9 at the upstream side of the throttle valve 20. A branch passage 22 extends from the intake passage 9 between the pre-chamber 21 and the compressor C. This branch passage 22 communicates with a resonance chamber 23. The intake passage 9 upstream the compressor C is opened to the atmosphere by way of the air cleaner Ac. The exhaust passage downstream the turbine T is opened to the atmosphere by way of the exhaust muffler M. Accordingly, the intake port 5, the intake passage 9 and the air cleaner Ac form an intake system "In". On the other hand, the exhaust port 6, the exhaust passage 10 and the exhaust muffler M form an exhaust system "Ex". The exhaust pipe 10 upstream the exhaust turbine 14 is connected thereto downstream the exhaust turbine 14 by way of a waist pipe 28. A waist gate valve 29 is placed in the middle of waist pipe 28. In waist gate valve 29, there are formed an operative pressure chamber 29e and an atmospheric pressure chamber 29d by means of a diaphragm 29b. The operative pressure chamber 29c communicates with the intake pipe 9 between the compressor C and the pre-chamber 21 by way of a pipe 30. When the operative pressure in the operative pressure chamber 29c is equal to or lower than a predetermined value, the diaphragm 29b is displaced towards the operative pressure chamber 29c by a pushing force of a spring 29e which is mounted in the atmospheric pressure chamber 29d. Consequently, a valve body 29a which is integrally mounted onto the diaphragm 29b comes in contact with a valve seat 28a which is provided in the waist pipe 28, thereby interrupting the path in the waist pipe 28.

A secondary air supply passage 31 is provided with an opening end 31a in the vicinity of the exhaust port 6 in such a way that the pre-chamber 21 communicates with the exhaust pipe 10. A check valve 32 is provided in the middle of this secondary air supply passage 21. For example, the check valve 32 is separated by a partition wall 32a to provide an upper chamber 32b which communicates with the pre-chamber 21 and a lower chamber 32c which communicates with the exhaust pipe 10. In addition, the check valve 32 comprises a reed 32e which is mounted onto the wall 32a to face the lower chamber 32c and opens and closes an opening 32d which is formed in the wall 32a.

The operation of the invention in accordance with this first embodiment will now be given.

Air which is supplied to the engine E is compressed by means of the compressor C of the turbo charger T via the air cleaner Ac to be temporarily stored in the pre-chamber 21. After that, the quantity of the air is adjusted by the throttle valve 20 and the air is supplied to the engine E. The pressure variance of the sucked-in air is attenuated by means of the pre-chamber 21 so that the air which has a substantially constant pressure is supplied to the engine E. This suppresses the output variance which accompanies the variance of the sucked-in air quantity of the engine E. The resonance chamber 23 functions to adjust the characteristic frequency of one portion of the intake pipe 9 disposed between the compressor C and the pre-chamber 21 to attenuate any pressure vibration in the pipe. That is, if there is a pressure pulsation in the intake passage 9 due to intermittent actuation or the like of the intake valve 7 while the engine is being driven, it is attenuated because of the pre-chamber 21 and the resonance chamber 23. This makes it possible to prevent the surging phenomenon of the compressor C and correspondingly the charging efficiency can be enhanced.

On the other hand, exhaust gas is introduced to the exhaust turbine T to drive that exhaust turbine. Power is transmitted from the exhaust turbine T to the compressor C via the driving shaft 15 to make the compressor C compress the sucked-in input air. The exhausted gas which has passed through the exhaust turbine T is muffled by means of the muffler M and discharged into the atmosphere. The higher the rotation speed of the engine becomes, the higher the pressure in the pre-chamber 21 becomes due to the supercharging by the turbo charger S. If this pressure becomes higher than a predetermined value, the pressure increase functions in the operative pressure chamber 29c of the waist gate valve 29 by way of the pipe 30, to move the diaphragm 29b, that is, the valve 29a to the right against the pushing force of the spring 29e, thereby opening the path in the waist pipe 28. As a result, one portion of the exhaust gas bypasses the exhaust turbine T by the waist pipe 28 in such a way that the quantity of the flow of the exhaust gas is adjusted so that the pressure in the pre-chamber 21 due to the compressing by the turbo charger S may not become higher than the predetermined value.

One portion of the air which is compressed by means of the turbo charger S and which is supplied to the pre-chamber 21 is supplied to the exhaust pipe 10 via the secondary air supply passage 31 and the check valve 32. CO or HC which remains in the exhaust gas is completely burned in the exhaust pipe 10 by this secondary air. That is, when the pressure in the upper chamber 2b of check valve 32 is higher than that in the lower chamber 32c, i.e., when the pressure in the pre-chamber 21 is higher than that in the exhaust pipe 10, the reed 32e is opened so that the secondary air is supplied to the exhaust pipe 10. Conversely, when the pressure in the lower chamber 32c is higher than that in the upper chamber 32b, the reed 32e is closed to prevent the back flow of the exhaust gas into the pre-chamber 21.

The pressure of the sucked-in input air in the pre-chamber is a positive pressure which is substantially equal to or higher than atmospheric pressure in driving ranges such as idling, accelerating, cruising, decelerating or the like. In particular, the pressure in the pre-chamber 21 reaches a considerably high positive pressure due to compressing by means of the turbo charger S in the high speed driving range. In addition, the opening end 31a of the secondary air supply passage 31 is opened in the vicinity of the exhaust port 6 as mentioned above. The vicinity of exhaust port 6 is a place where there is generated a large negative pressure (small pressure in the absolute pressure) which is induced by the exhaust jet when the exhaust valve 8 is opened. The exhaust jet flows out at a high speed. Therefore, it is possible to increase the pressure difference between it and the pressure in the pre-chamber 21 in comparison with that at another location in the exhaust pipe 10. Hence, it becomes possible to supply a suitable amount of secondary air to the exhaust pipe 10 even if the exhaust pressure of the exhaust pipe 10 is high in the engines high speed driving range.

Figure 2:
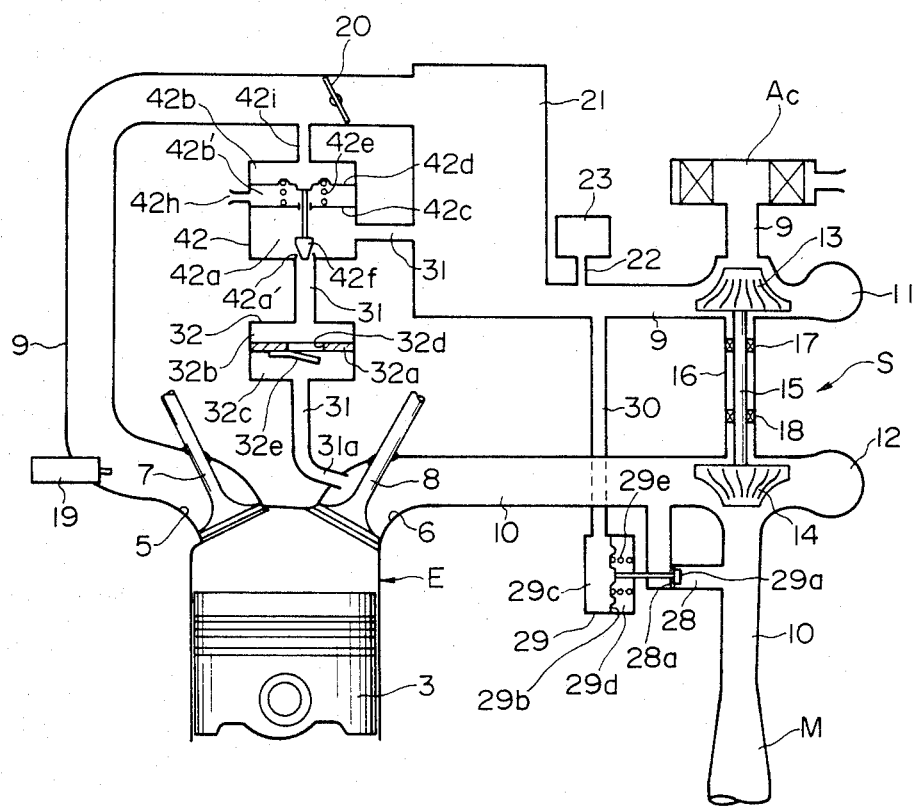
FIG. 2 is a schematic view showing a second embodiment of an internal combustion engine which is provided with a turbo charger.

A second embodiment of the present invention is shown in FIG. 2, wherein like parts and components are designated by the same reference numerals and characters as those shown in the first embodiment. Further, for simplicity, cylinder block and cylinder head are not shown in FIG. 2.

In accordance with the second embodiment, a secondary air control valve 42 is mounted upstream of the check valve in the middle of the secondary air supply passage 31. The secondary air control valve 42 is separated by means of a partition wall 42c which is provided at the center in the casing in such a way as to form control chambers 42b, 42b' and a lower chamber 42a. The lower chamber 42a at the upstream side communicates with the pre-chamber 21 by way of the secondary air supply pipe 31 while the lower chamber 42a at the downstream side communicates with the exhaust pipe 10 by way of the check valve 32. In addition, the control chambers 42b, 42b' are separated from each other by a diaphragm 42d to form an upper control chamber 42b which communicates with the intake pipe 9 downstream the throttle valve 20 by way of the pipe 42i and an atmospheric pressure chamber 42b' of which the lower surface is formed by the wall 42c. The atmospheric pressure chamber 42b' communicates with atmosphere by way of port 42h. A valve body 42f is mounted onto the diaphragm 42d in such a way as to pass through a spring 42e which is mounted between the wall 42c and the diaphragm 42d. The spring 42e biases the diaphragm 42d upward. The check valve 32 is constituted in the same way as in the first embodiment, but as shown in FIG. 2 the upper chamber 32b thereof communicates with the lower chamber 42a of the secondary control valve 42.

Now, an explanation will be given with respect to the operation of a second embodiment of this invention. When the pressure in the upper control chamber 42b of the secondary control valve 42 is low, the pushing force of the spring 42e overcomes the pressure on the diaphragm 42d which faces the upper control chamber 42b to displace the diaphragm 42d upward. As a result, the valve body 42f is pulled up and the valve is opened. At this time, secondary air is supplied to the exhaust pipe 10 from the pre-chamber 21 unless the check valve 32 is closed.

The turbo charger compresses the sucked-in air when the engine is in a heavy load driving range, so that the pressure in the vicinity of the location downstream the throttle valve 20 increases. If this pressure becomes higher than a predetermined positive pressure, it functions on the diaphragm 42d to displace downwards the diaphragm 42d against the pushing force of the spring 42e. As the result, the valve body 42f closes the port 42g downstream the lower chamber 42a, thereby interrupting the supply of the secondary air to the exhaust pipe 10. If the secondary air control valve 42 is closed as mentioned above, then all of the sucked-in air is supplied to the engine, thereby securing the required air quantity in the heavy load driving range resulting in a high output.

When the pressure in the exhaust pipe 10 is higher than that in the pre-chamber 21, in other words, when the pressure in the lower chamber 32c is higher than that in the upper chamber 32b, the reed 32e of the check valve 32 is closed, thereby preventing the back flow of the exhaust gas into the pre-chamber 21.

Although the upstream side of the secondary air supply passage 31 is opened to the pre-chamber 21 in the above-mentioned embodiments, it is also acceptable that the upstream side of the secondary air supply passage 21 is opened to any other location provided where it is possible to obtain sucked-in air which is compressed by means of the turbo charger S. For example, it is acceptable that the upstream side of the secondary air supply passage 31 is opened into the intake pipe between the pre-chamber 21 and the throttle valve 20 or between the turbo charger S and the pre-chamber 21.

Figure 3:
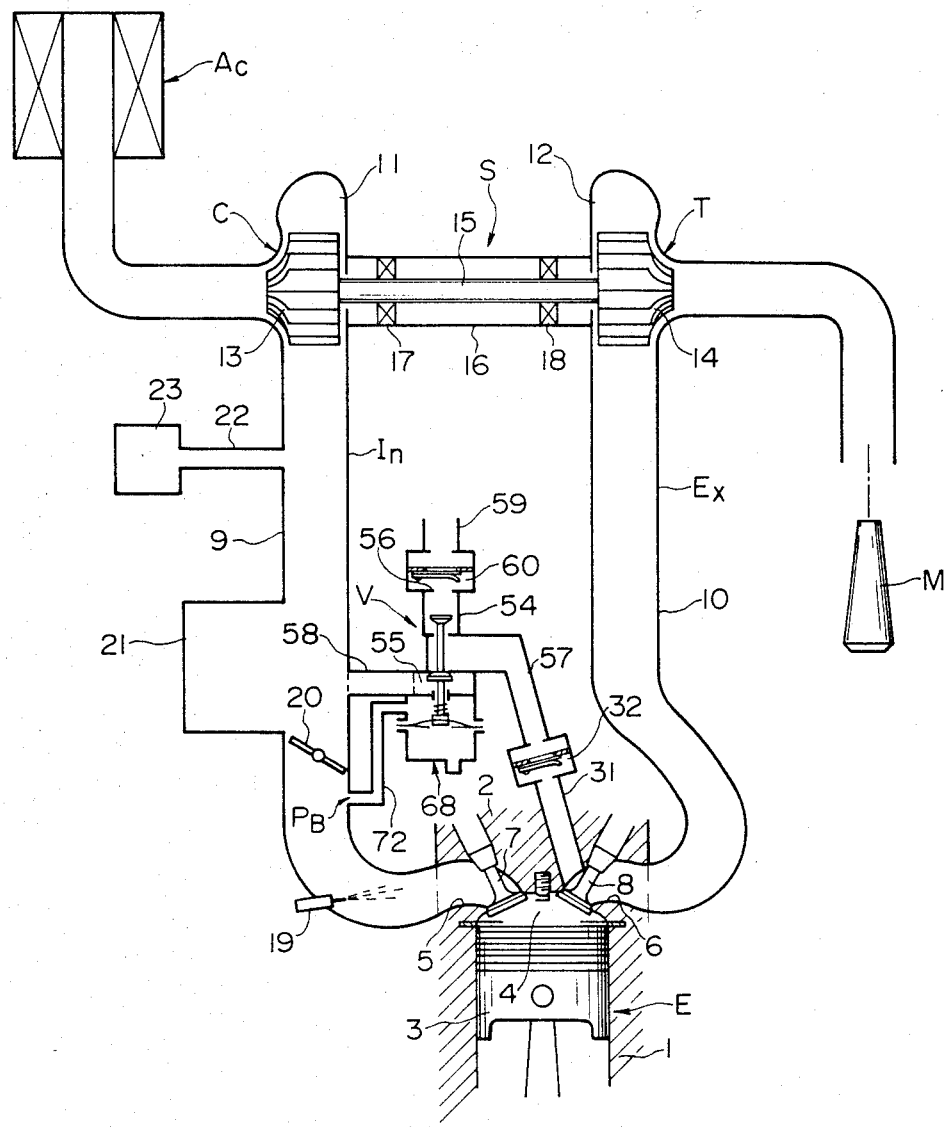
FIG. 3 and FIG. 4 illustrate a third embodiment in accordance with the present invention, where
Figure 4:
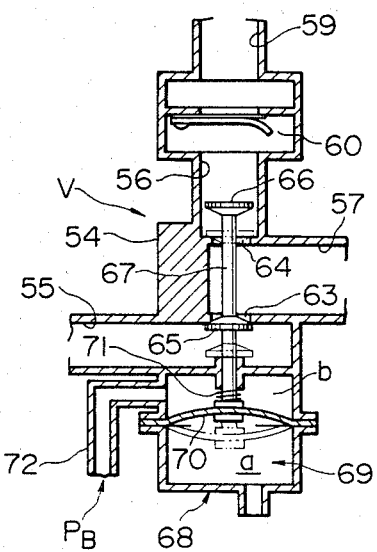

A third embodiment of the invention is shown in FIGS. 3 and 4, wherein like parts and components are designated by the same reference numerals and characters as those shown in the foregoing embodiments.

In accordance with the third embodiment, there is provided a switch valve V between the intake passage 9 and the exhaust passage 10. FIG. 4 illustrates the construction of the switch valve V. There are formed two inflow ports, that is, the first and second inflow ports 55, 56 and one outflow port 57 in a valve casing 54. The first inflow port 55 communicates with the pre-chamber 21 by way of a supercharged air passage 58. On the other hand, the second inflow port 56 communicates with atmosphere by way of an atmospheric passage 59. A one-way valve, that is, a check valve 60 is interposed in the middle of the atmospheric passage 59. Check valve 60 permits the inflow of the atmosphere only from the atmosphere into the second inflow port 56. The outflow port 57 communicates with the exhaust port 6 by way of the secondary air supply passage 31. A one-way valve (check valve), shown as a reed valve 32 is interposed in the middle of the secondary air supply passage 31. The reed valve 32 is opened by the exhaust pulsation pressure which is caused in the exhaust system "Ex", to introduce the secondary air in the secondary air supply passage 31 into the exhaust system.

In the valve casing 54, the first valve body 65 opens and closes the first communication port 63 of the first inflow port 55 and the outflow port 57. Furthermore, there is provided the second valve body 66, which opens and closes the second communication port 64 of the second inflow port 56 and the outflow port 57. The first valve body 65 and the second valve body 66 are coupled to each other by means of a valve rod 67 in such a way that they are alternately opened and closed by the axial sliding control of valve rod 67. The valve rod 67 projects into a diaphragm actuation chamber 69 in a valve actuator 68 which is provided integral with the valve casing 54, in such a way to be connected to a diaphragm 70 which is in turn provided in the chamber 69. The diaphragm 70 separates the diaphragm actuation chamber 69 into an atmospheric pressure chamber (a) and a negative pressure chamber (b). In addition, the diaphragm spring 71 is biased in such a way to be displaced towards the atmospheric chamber (a) by the spring force of the diaphragm spring 71. The negative pressure chamber (b) communicates with the intake passage 9 downstream of the throttle valve 20 by way of a negative pressure passage 72, so that the boost negative pressure $P_B$ in the intake passage 9 functions. In addition, the atmospheric pressure chamber (a) is opened to the atmosphere.

Now, an explanation will be given with respect to the functioning of the third embodiment of the present invention. Since the throttle valve 20 is completely closed or opened very little in low speed, idling and decelerating driving ranges of the engine, the boost pressure $P_B$ downstream this throttle valve 20 is high. This functions in the negative pressure chamber (b) by way of the negative pressure passage 72 in such a way to attract upward the diaphragm 70 and displace it against the spring force of the diaphragm spring 71. This is indicated by the solid line in FIG. 4. As the result, the first communication port 63 is closed by the first valve body 65 and at the same time, the second communication port 64 is opened by the second valve body 66. The secondary air supply passage 31 which communicates with the exhaust port 6 communicates with the atmosphere by way of the atmospheric pressure passage 59.

When the exhaust pulsation pressure created in the exhaust system "Ex" by the driving of the engine intermittently opens the reed valve 32 to introduce air at atmospheric pressure into the exhaust port 6 as the purifying secondary air. This makes it possible for the unburned harmful components such as HC, CO or the like in the exhaust gas which flows through the exhaust system "Ex" which is composed of the exhaust port 6, the exhaust passage 10 and the exhaust muffler M to be oxidized and removed.

Since the degree that the throttle valve is opened increases in the middle and high speed driving range of the engine and the boost pressure $P_B$ is reduced, the negative pressure which functions in the negative pressure chamber (b) is also reduced, so that the diaphragm 70 is displaced downwards by the spring force of the diaphragm spring 71. This is indicated by the chained line in FIG. 4. As the result, the first communication port 63 is opened by means of the first valve body 65 while the second communication port 64 is closed by means of the second valve body 66. The supercharged pressure air in the pre-chamber 21 is introduced to the exhaust port 6 as the secondary air for purifying the exhaust gas by way of the supercharged air passage 58, the valve casing 54 and the secondary air supply passage 31. As mentioned above, it is then possible to effectively burn again the unburned harmful components such as HC, CO or the like in the exhaust gas which flows through the exhaust system Ex. Hence, the reed valve 60 which is interposed in the atmospheric passage 59 in the above-mentioned actuation is employed for preventing the supercharged air which is supplied to the secondary air supply passsage 31 from the pre-chamber 21 from leaking into the atmosphere in the process to open and close the first valve body 65 and the second valve body 66.

Figure 5:
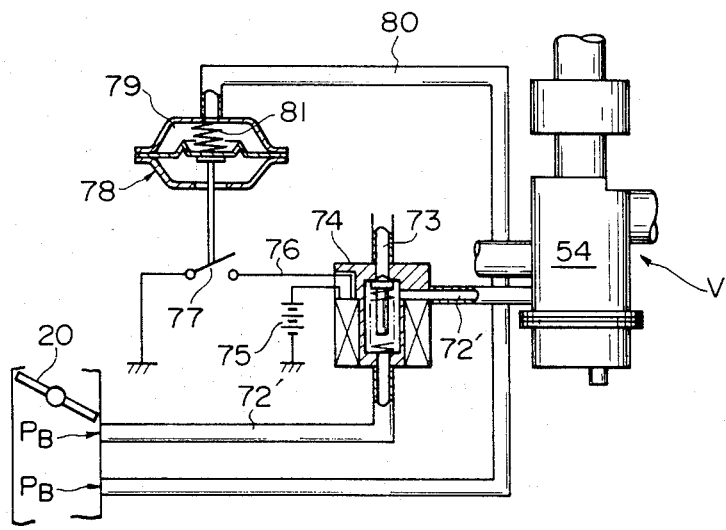
FIG. 5 is a schematic systematic view showing a fourth embodiment in accordance with the present invention.

A fourth embodiment in accordance with the present invention is shown in FIG. 5. In accordance with this embodiment, the above-described switch valve V is controlled to be opened and closed by means of a solenoid valve 74. A negative pressure passage 72' communicates with the intake passage 9 downstream the throttle valve 20 in communication with the negative pressure chamber (b) of the valve actuator 68 of the switch valve V. An atmosphere passage 73 is branched in the middle of the negative pressure passage 72', the solenoid valve 74 opens and closes the atmosphere passage 73 at the branched portion. The solenoid valve 74 is connected to an electric power source circuit 76 which is connected to a battery 75. A pressure switch 77 opens and closes the circuit 76 in the electric power source circuit 76. A negative pressure actuator 78 is connected to the pressure switch 77.

The negative pressure actuation chamber 79 in the actuator 78 communicates with the intake passage 9 downstream the throttle valve 20 by way of a communication passage 80. If the degree that the throttle valve 20 is opened is reduced so that the boost pressure $P_B$ in the intake passage 9 increases, the negative pressure in the negative pressure actuation chamber 79 also becomes high so that the pressure switch 77 is opened. This is shown in FIG. 5. If the degree that the throttle valve 20 is opened is increased so that the boost pressure $P_B$ in the intake passage 9 decreases, the pressure switch 77 is closed by the spring force of the spring 81 in the negative pressure actuator 78. When the pressure switch 77 is closed so that the electric power source circuit 76 is closed, the solenoid valve 74 is energized to be opened. As the result, the negative pressure passage 72' communicates with atmosphere.

An explanation will now be given with respect to the function of the fourth embodiment of this invention.

The throttle valve 20 is opened to a small degree in the low speed, idling and decelerating driving ranges of the engine. In this range, the high boost pressure $P_B$ functions in the negative pressure actuator 78 by way of the communication passage 80 to release the pressure switch 77. This is shown in FIG. 5. Therefore, the solenoid valve 74 remains in the closed position so that the high boost pressure $P_B$ functions in the negative pressure chamber (b) of the switch valve V by way of the negative pressure passage 72'. The secondary air supply passage 31 communicates with the atmosphere passage 59 in the same way as in the third embodiment so that air at atmospheric pressure is introduced into the exhaust system "Ex" as secondary air for purifying the exhaust gas.

The degree that the throttle valve 20 is opened increases in the middle speed and high speed driving range of the engine so that the boost pressure $P_B$ decreases to a low value. The negative pressure which functions into the negative pressure actuator 78 by way of the communication passage 80 also lowers, so that the pressure switch 77 is closed by the spring force of the spring 81. The electric power source circuit 76 is closed so that the solenoid valve 74 is energized and opened. The negative pressure passage 72' communicates with the atmosphere passage 73 so that the atmospheric pressure functions in the negative pressure chamber (b). In the same manner as in the third embodiment as mentioned above, the secondary air supply passage 31 communicates with the turbocharged air supply passage 58 which is in communication with the pre-chamber 21. As a result, turbocharged positive pressure air is sent into the exhaust system as the secondary air for purifying the exhaust gas.

Although a single cylinder of an engine is shown to simplify the explanation, the present invention is effective even when applied to multi-cylinder engines. Hence the utility of the invention exists in single cylinder engines and in multi-cylinder engines.

In addition, in accordance with this invention the diaphragm-type secondary air control valve as shown can be replaced by an electromagnetic valve actuated in accordance with the driving condition of the engine as detected by sensors respectively for the vehicle speed, the rotation of the engine, the pressure, the degree that the throttle valve is opened and the like. The supply of the secondary air to the exhaust pipe 3 in the heavy load condition is accordingly interrupted by this detected signal.

In accordance with the system for supplying a secondary air in an internal combustion engine which is provided with a turbo charger in accordance with the present invention as explained in detail hereinabove. There is provided a secondary air supply passage by which the exhaust passage communicates with the reservoir which is provided in the middle of the intake passage and there is also provided a check valve which prevents the back flow of the exhaust gas in the middle of this secondary air supply passage. It is possible given these elements to supply a suitable amount of secondary air from the reservoir chamber which has a high pressure to the exhaust passage even in the high speed driving range of the engine. Hence, it is possible to sufficiently reduce the emission of CO or HC due to the supply of the secondary air in the exhaust passage even if no special pump or the like for supplying the air is utilized. The cost is low because construction is simple, and durability is excellent.

Furthermore, since the supply of the secondary air to the exhaust pipe is interrupted in the high speed driving range of the engine and all the sucked-in air is supplied to the engine, it is possible to obtain the necessary amount of air for the engine. Hence, it is possible to keep the high output of the engine in the high speed driving range. In accordance with the third and fourth embodiments, the secondary air supply passage 31 which communicates with the exhaust system "Ex" of the engine communicates with the atmospheric passage 59 which is open to the atmosphere by way of the switch valve V or the turbocharged air passage 58 which communicates with the intake system "In" upstream the throttle valve 20. In the low speed, idling and decelerating rotation range of the engine, air at atmospheric pressure is introduced into the exhaust system "Ex" as secondary air for purifying the exhaust gas by the valve actuator 68 of the switch valve V utilizing the exhaust pulsation pressure.

In the middle and high speed driving range of the engine, the turbocharged positive pressure air in the intake system "In" is introduced into the exhaust system "Ex" as the secondary air for purifying the exhaust gas. Therefore, there is less turbulence especially in the exhaust pulsation pressure. The turbocharged positive pressure air in the intake system "In" is pressed into the exhaust system "Ex", thereby making it possible to suitably control the quantity of the secondary air for purifying the exhaust gas with respect to the quantity of the exhaust gas in the middle and high speed driving range without depending upon the exhaust pulsation pressure in the middle and high speed driving range of the engine. The desired quantity of secondary air is supplied into the exhaust system "Ex" over the entire driving range of the engine as a whole, thereby making it possible to effectively reduce unburned harmful components such as HC, CO or the like in the exhaust gas.

What is claimed is:

1. An internal combustion engine comprising: a turbocharger having a compressor for compressing sucked-in air flowing through an intake system in communication with a combustion chamber; means for controlling secondary air for purifying the exhaust gas, comprising a secondary air supply passage having one end in communication with an exhaust system, said exhaust system in communication with said combustion chamber, said secondary air supply passage having a first passage opened at an intake passage portion between said turbocharger and a throttle valve, and a second passage in communication with the atmosphere, said secondary air supply passage having the other end in communication with the atmosphere and the intake passage portion through a switch means adapted to selectively switch between said first and second passages.

2. An internal combustion engine of claim 1, wherein said switch means comprises a valve actuator operable in response to an internal pressure within said intake passage at its position downstream side of said throttle valve, upon actuation of said valve actuator said secondary air supply passage being switched in such a way as to communicate with said second passage in the low speed, idling and decelerating driving ranges of the engine, and said secondary air supply passage being switched to communicate with said first passage in the middle and high speed driving ranges of the engine.

3. The internal combustion engine of claim 2, wherein said switch means further comprises; a valve rod in association with said valve actuator; a first valve body mounted on said valve rod, said first valve body opening and closing a first communication port which provides communication between a prechamber and an exhaust passage; a second valve body mounted on said valve rod, said second valve body opening and closing a second communication port which provides communication between said exaust passage and an atmosphere; and a one-way valve positioned at upstream side of said second valve body, said one-way valve being adapted to prevent the turbocharged air from said prechamber from leaking into the atmosphere when both said first and second valve bodies open said first and second communication ports.

4. The internal combustion eingine of claim 3, wherein said one-way valve comprises a reed valve.

* * * * *